United States Patent
Raza et al.

(10) Patent No.: US 10,992,654 B2
(45) Date of Patent: Apr. 27, 2021

(54) SECURE WAN PATH SELECTION AT CAMPUS FABRIC EDGE

(71) Applicant: Cisco Technology, Inc., San Jose, CA (US)

(72) Inventors: Syed Khalid Raza, Fremont, CA (US); Mosaddaq Hussain Turabi, San Jose, CA (US); Fabio Rodolfo Maino, Palo Alto, CA (US); Vina Ermagan, San Francisco, CA (US); Atri Indiresan, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 196 days.

(21) Appl. No.: 16/104,456

(22) Filed: Aug. 17, 2018

(65) Prior Publication Data

US 2020/0059457 A1    Feb. 20, 2020

(51) Int. Cl.
*H04L 29/06* (2006.01)
*H04L 12/28* (2006.01)
*H04L 12/46* (2006.01)

(52) U.S. Cl.
CPC ...... *H04L 63/0485* (2013.01); *H04L 12/2854* (2013.01); *H04L 12/4633* (2013.01); *H04L 63/0471* (2013.01); *H04L 69/22* (2013.01)

(58) Field of Classification Search
CPC ............. H04L 63/0485; H04L 12/2854; H04L 63/0471; H04L 69/22; H04L 12/4633; H04L 69/14
See application file for complete search history.

(56) References Cited

U.S. PATENT DOCUMENTS

| | | | | |
|---|---|---|---|---|
| 5,898,784 A | * | 4/1999 | Kirby | ...................... H04L 29/06 713/153 |
| 6,307,837 B1 | * | 10/2001 | Ichikawa | ............ H04L 63/0236 370/230 |
| 6,330,562 B1 | | 12/2001 | Boden et al. | |
| 7,573,823 B2 | | 8/2009 | Halme | |

(Continued)

OTHER PUBLICATIONS

Moreno, et al., "LISP Virtual Private Networks (VPNs)," IETF, Network Working Group, Internet Draft, Nov. 2017, 16 pages.

(Continued)

*Primary Examiner* — Meng Li
(74) *Attorney, Agent, or Firm* — Edell, Shapiro & Finnan, LLC

(57) ABSTRACT

A method is performed by an access router of an enterprise network including a first edge router to communicate with a second edge router over a wide area network (WAN). The method includes receiving a packet from a first endpoint, receiving from a mapping service a network location of a second edge router for which the packet is destined and a security association (SA) to encrypt the packet from the access router to the second edge router, and generating for the first edge router one or more path selectors for WAN path selection. The method includes encrypting the packet using the SA, and adding to the encrypted IP packet, in clear text, the path selectors and outer encapsulation including the network location, to produce an encrypted tunnel packet. The method also includes forwarding the encrypted tunnel packet to the second edge router via the first edge router and the WAN.

20 Claims, 13 Drawing Sheets

(56) References Cited

U.S. PATENT DOCUMENTS

| | | | |
|---|---|---|---|
| 8,767,757 | B1 | 7/2014 | Chudgar et al. |
| 9,258,218 | B2 | 2/2016 | Hampel et al. |
| 9,560,018 | B2 | 1/2017 | Bellagamba et al. |
| 10,652,220 | B1* | 5/2020 | Ramanujan .......... H04L 63/0478 |
| 2003/0196081 | A1* | 10/2003 | Savarda ................ H04L 63/164 |
| | | | 713/153 |
| 2006/0245363 | A1* | 11/2006 | Ravindran ............ H04L 45/302 |
| | | | 370/238 |
| 2009/0144819 | A1* | 6/2009 | Babbar ................ H04L 63/164 |
| | | | 726/13 |
| 2015/0372928 | A1* | 12/2015 | Basilier .................. H04L 69/22 |
| | | | 370/235 |
| 2016/0294681 | A1* | 10/2016 | Khakpour ............. H04L 45/306 |
| 2017/0070908 | A1* | 3/2017 | Ogura ............... H04W 28/0268 |
| 2017/0104851 | A1* | 4/2017 | Arangasamy ....... H04L 63/0428 |
| 2017/0353384 | A1* | 12/2017 | Chayat .................. H04L 45/566 |
| 2018/0077068 | A1 | 3/2018 | Dhanabalan |
| 2018/0139191 | A1 | 5/2018 | Shi et al. |
| 2019/0327172 | A1* | 10/2019 | Shen .................. H04L 43/0876 |

OTHER PUBLICATIONS

Maino, et al., "GPE-VPN: Programmable LISP-based Virtual Private Networks," IETF, LISP Working Group, Internet Draft, Mar. 2016, 11 pages.

Farinacci, et al., "Locator/ID Separation Protocol (LISP) Data-Plane Confidentiality," IETF, Request for Comments: 8061, Feb. 2017, 18 pages.

Earls, "Software Defined Networking Security Enables Granular Policy Control," SDN Basics for Service Providers, SDN.com, Mar. 5, 2013, 2 pages.

Maino, et al., "Generic Protocol Extension for VXLAN," IETF, Networking Working Group, Internet Draft, Oct. 2017, 17 pages.

Calhoun, et al., "Control and Provisioning of Wireless Access Points (CAPWAP) Protocol Specification," IETF, Network Working Group, Request for Comments 5415, Mar. 2009, 155 pages.

Niazi, et al., "Group Encrypted Transport VPN (Get VPN) Design and Implementation Guide," Cisco Systems, Ordering Guide, Oct. 2010, updated Mar. 2015, 157 pages.

* cited by examiner

US 10,992,654 B2

SECURE WAN PATH SELECTION AT CAMPUS FABRIC EDGE

TECHNICAL FIELD

The present disclosure relates to wide area network (WAN) path selection and encryption for enterprise networks.

BACKGROUND

An enterprise network includes a main campus network that communicates with remote branch office networks over a wide area network (WAN). Conventional forwarding of traffic from the campus network to the branch networks may include encapsulating the traffic in a tunnel at a campus network fabric edge (FE) router, which provides endpoint devices with access to the campus network, and tunneling the encapsulated traffic directly to a campus border router (CBR), which provides the campus network with access to the WAN. The CBR decapsulates the traffic, selects a WAN path using fields from the traffic, encrypts the traffic, and then forwards the encrypted traffic to a branch router (BR) over the WAN, which then forwards the traffic to a destination endpoint device. Disadvantageously, such conventional forwarding of traffic exposes the traffic, while unencrypted, to malicious attack at the CBR. Encrypting the traffic at the FE router protects the traffic from the attack at the CBR, but also complicates WAN path selection at the CBR, and may require that the CBR expend computational resources to decrypt and then re-encrypt the traffic prior to forwarding it to the BR.

DESCRIPTION OF EXAMPLE EMBODIMENTS

Overview

A method is performed by an access router of an enterprise network including a first edge router configured to communicate with a second edge router over a wide area network. The method includes, at the access router, receiving from a first endpoint device an Internet Protocol (IP) packet destined for a second endpoint device configured to communicate with the second edge router, receiving from a mapping service a network location of the second edge router and a security association to encrypt the IP packet from the access router to the second edge router, and generating for the first edge router one or more path selectors upon which wide area network path selection is based. The method further includes encrypting the IP packet using the security association, and adding to the encrypted IP packet, in clear text, the one or more path selectors and outer encapsulation including the network location, to produce an encrypted tunnel packet. The method also includes forwarding the encrypted tunnel packet to the second edge router via the first edge router and the wide area network based on the outer encapsulation.

Example Embodiments

Figure 1:
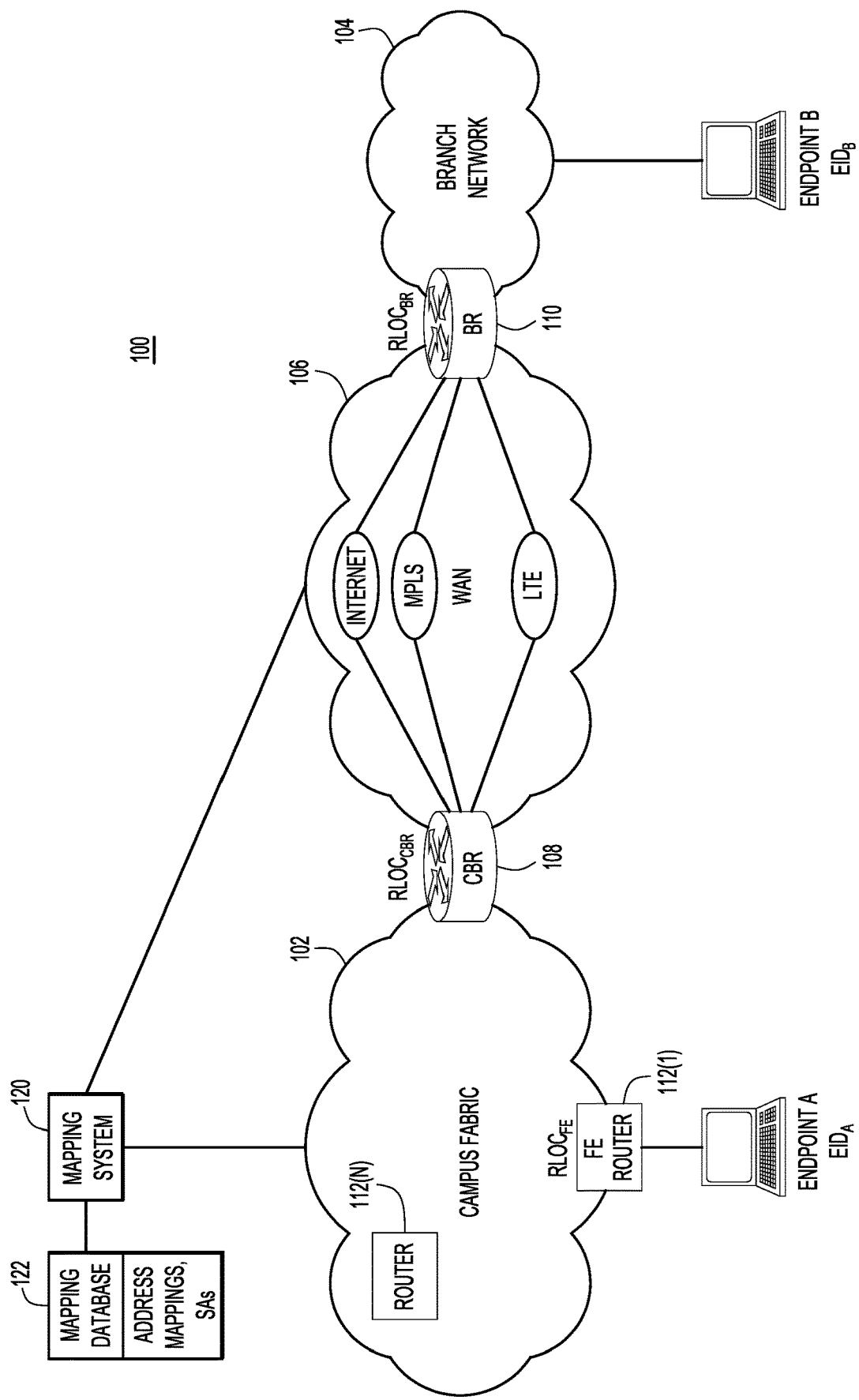
FIG. 1 is a high-level block diagram of an enterprise network system in which secure wide area network (WAN) path selection at an access edge of a campus network may be implemented, according to an example embodiment.

Referring first to FIG. 1, there is shown a high-level block diagram of an example enterprise network system 100 in which secure wide area network (WAN) path selection at an access edge of a campus network may be implemented. Enterprise network system 100 communicates bidirectional traffic (i.e., packets) between endpoint devices A and B (referred to simply as "endpoints A and B"). Endpoints A and B may be computing devices configured to communicate with networks wirelessly or through wired connections, such as desktop computers, laptop computers, smart phones, tablet computers, servers, virtual machines, or internet telephones, for example. Enterprise network system 100 includes a first enterprise network 102 (referred to as a "campus network") connected to endpoint A, a second enterprise network 104 (referred to as a "branch network") connected to endpoint B, and a WAN 106 connected to the campus network and the branch network through a first WAN edge router 108 (referred to as a "campus branch router (CBR)") and a second WAN edge router 110 (referred to as a "branch router (BR)"), respectively. One endpoint A and one endpoint B are shown in FIG. 1, by way of example only. It is understood there may be many endpoints connected to campus network 102 and many endpoints connected to branch network 104. Also, while only one branch network is shown in FIG. 1, other enterprise network arrangements may include many branch networks. Moreover, branch network 104 may be omitted such that endpoint B accesses BR 110 directly, rather than indirectly through a branch network. The aforementioned routers (also referred to as "router devices") are each, more generally, any network device, such as a router or a switch, capable of routing/forwarding network traffic in a communication network.

Campus network 102 may include a Virtual Extensible (Vx) local area network (LAN) (VxLAN)-based fabric (i.e., a "campus fabric") such as software defined (SD) access network by Cisco. WAN 106 may be implemented as an SD-WAN, and may include multiple networks, such as the Internet, a multiprotocol label switching (MPLS) network, and a wireless network, e.g., a Long-Term Evolution (LTE) network. CBR 108 provides campus network 102 with access to WAN 106, performs WAN path selection, and thus routes the above-mentioned bidirectional traffic between campus network 102 and WAN 106 over best WAN paths. Similarly, BR 110 provides branch network 104 with access to WAN 106, and thus routes the bidirectional traffic between WAN 106 and branch network 104.

Campus fabric 102 includes routers 112(1)-112(N) (collectively referred to as routers 112) configured to communicate with each other and CBR 108. Among routers 112, router 112(1) (designated a "fabric edge (FE) access router" or more simply an "FE router"), is connected to endpoint A, and provides the endpoint with access to WAN 104 through CBR 108. Similarly, branch network 104 includes routers (not explicitly shown in FIG. 1) configured to communicate with each other and to provide endpoints, such as an endpoint B, connected with the routers, with access to WAN 106 through BR 110. Thus, endpoint devices A and B exchange traffic with each other through campus fabric 102, CBR 108, WAN 106, BR 110, and branch network 104. The above-mentioned routers (also referred to as "router devices") may each be a devices that may take the form as routers or switches.

An example implementation of enterprise network system 100 employs a Locator/Identifier (ID) Separation Protocol (LISP) network model. Under the LISP network model, Internet Protocol (IP) addresses of endpoints represent endpoint identifiers (EIDs), while IP addresses of network devices (e.g., routers) represent routing locators (RLOCs). In the example of FIG. 1, endpoints A, B have respective EIDs $EID_A$, $EID_B$, while FE router 112(1), CBR 108, and BR 110 have respective RLOCs $RLOC_{FE}$, $RLOC_{CBR}$, and $RLOC_{BR}$. When an endpoint attaches to a router, the network location of the endpoint is specified by the RLOC of the router to which the endpoint is connected. The "network" that connects the routers in the RLOC space is called the "underlay," while the "virtual network" that connects the endpoints via their EIDs (i.e., representing source and destination EIDs) is called the "overlay." To send an overlay packet from a source endpoint to a destination endpoint at an appropriate network location, the intervening routers encapsulate the overlay packet using an IP-in-IP network tunnel encapsulation, such as VxLAN or LISP data plane.

Enterprise network system 100 also includes a mapping system 120 (also referred to as a "mapping service") configured to communicate with campus fabric 102, branch network 104, and WAN 106. Mapping system 120 creates and maintains one or more databases 122 that store global network address mapping information and cryptographic information, such as security associations (SAs). Mapping system 120 dynamically provisions various ones of the above-mentioned network elements with the address mapping information and the cryptographic information, i.e., security associations, for secure, end-to-end, communications between endpoints, e.g., between A and B. In the LISP network model, mapping system 120 and database 122 may comprise a LISP MapServer, which represents a LISP control plane service that maps endpoint identifiers (i.e., EIDs) to their corresponding locations (i.e., RLOCs).

In conventional two-step traffic (e.g., packet) forwarding between campus network 102 and branch network 104, FE router 106 encapsulates traffic originated at endpoint device in a VxLAN tunnel for direct forwarding to CBR 108, and forwards the encapsulated traffic to the CBR. CBR 108 decapsulates the traffic, and forwards the traffic to BR 110, which then forwards the traffic to destination endpoint B. One reason for conventional two-step traffic forwarding is that in that arrangement, the FE router 112(1) may not have a full routing table, so the FE router forwards all traffic to unknown destinations of branch network 104 first to CBR 108, which typically has the missing routing information for the branch network. The two-step traffic flow may be secured using a limited first crypto (VxLAN) tunnel to CBR 108, and a second crypto tunnel (such as an Internet Protocol (IP) Security (IPsec) crypto tunnel) to BR 110. In this scenario, CBR 108 decrypts and then re-encrypts the traffic, so as to access original, unencrypted traffic, which disadvantageously exposes the unencrypted traffic at the CBR to attack.

Because WAN 106 presents multiple WAN paths from CBR 108 to BR 110, the CBR may select a best WAN path among the multiple WAN paths based on one or more path selection/path selector fields in the traffic. In an example, the IP Differentiated Services Code Point (DSCP) field is a candidate WAN path selection field, and can be accessed at CBR 108 since it has access to the original unencrypted traffic, e.g., unencrypted IP traffic, resulting from decryption at the CBR under conventional two-step traffic forwarding.

The conventional two-step traffic forwarding may be acceptable for some traffic scenarios, but it disadvantageously exposes unencrypted traffic to malicious attack at CBR 108, and increases cryptographic processing loads at the CBR (due to decryption and re-encryption). Thus, there is a need for a more secure and efficient end-to-end communication between campus network 102 and branch network 104, while optimizing the use of WAN resources by dynamically selecting the best path between the campus network and the branch network. Accordingly, embodiments presented herein forward traffic using a single, end-to-end, crypto tunnel from FE router 112(1) all the way to BR 110 over WAN 106. This is highly desirable when forwarding sensitive classes of traffic, or when providing traffic forwarding optimization matched to security conscious customer requirements. The single, end-to-end, crypto tunnel advantageously (i) removes an expensive step of decrypting and re-encrypting traffic at CBR 108, hence reducing an overall traffic latency, and (ii) protects traffic confidentiality and integrity from attacks mounted at the CBR because the CBR does not decrypt traffic prior to forwarding of the traffic over WAN 106.

Forwarding traffic from FE router 112(1) to BR 110 using the single, end-to-end, crypto-tunnel, while concurrently enabling CBR 108 to perform WAN traffic selection based on WAN path selection fields in the traffic, presents the following challenges:

1) The FE router should, but may not, have a destination location (address) for the BR.
2) The number of branch networks may be large, e.g., in the thousands, which may exceed the number of crypto sessions that the cryptographic resources of the FE router may be able to handle at any given time.
3) When encrypted traffic from the FE router transits the CBR, the WAN path selection fields that would normally be used by the CBR for WAN path selection are already encrypted and thus unavailable to the CBR, since the CBR does not decrypt and then re-encrypted the encrypted traffic in the single, end-to-end encryption scenario. For example, if the CBR intends to base its WAN path selection on a DSCP field in a header of an IP packet that expresses a Quality-of-Service (QoS), and the IP packet is encrypted, the DSCP is not available to the CBR.

Embodiments presented herein decouple an encryption function of an enterprise fabric (i.e., campus network 102) from a dynamic WAN path optimization function at the CBR. This affords scalable end-to-end confidentiality/integrity across the enterprise fabric (from the enterprise fabric access to branch networks) while still allowing fine grain dynamic path selection over WAN 106.

The embodiments dynamically establish end-to-end security associations from FE router 112(1) to BR 110, while reflecting the path selection policy that should be applied to encrypted traffic (e.g., an encrypted packet) in a metadata tag that is added (e.g., prepended) to the encrypted packet. In this way overlay confidentiality is provided end-to-end (including the portion within campus network 102, which would otherwise be exposed to data spoofing or hijacking), while still allowing CBR 108 at the campus network edge adjacent WAN 106 to dynamically enforce the path selection policy.

Embodiments presented herein solve the above-mentioned problems (1)-(3) as follows. Problem (1) is solved by extending the scope of the MapServer. In a conventional enterprise campus deployment, the MapServer only includes entries for local hosts, and a default entry pointing to the CBR for all other destinations. Adding branch network hosts/prefixes to the MapServer enables the MapServer to return the tunnel information (i.e., location) for the BR, rather than just for the CBR.

Problem (2) is driven by hardware limitations in an FE router. Along with the BR location/address, the MapServer can be extended to store and return crypto session information (e.g., security associations) to requesting routers. However, hosts at an FE router are unlikely to be in contact with all of the branch networks simultaneously. If the FE router exhausts its cryptographic resources to encrypt traffic to the BR, the FE router may instead encrypt traffic to the CBR, which will continue to work in the default/conventional manner (i.e., to implement two-step forwarding, including decrypting and re-encrypting of traffic before forwarding the traffic). There will be some performance impact, but since most of the traffic is encrypted to the BR, benefit remains. The benefit may be optimized by sending low traffic streams via the conventional CBR tunnel, and sending high bandwidth streams directly to the BR, instead. In other words, policy can be applied optimally to use the limited crypto space on the FE router for sensitive traffic, while leveraging the CBR as a proxy to offload additional crypto sessions.

To solve problem (3), while encrypting traffic at the FE router, one or more clear-text path selectors may be inserted in a clear-text portion of the traffic, such that the CBR can access and interpret the clear-text path selector and direct the traffic across the selected WAN path, accordingly. The path selectors may be included as clear-text in a clear-text metadata header for crypto tunnels. The path selectors may be derived as follows:

a. Data Plane Driven: deriving the path selectors (also referred to as a "path selection tag" or "path selection field") from an inner IPv4/IPv6 DSCP field (in an L3 overlay) or an inner 802.1Q Priority Code Point (PCP) field (in an L2 overlay) in an IP/Ethernet frame sent by an endpoint.

b. Control Plane Driven: using the mapping system (e.g., the MapServer) to return a path selector field looking up attributes of the overlay IP/Ethernet frame such as <source group tag (SGT), destination group tag (DGT)> in security group tags (SGTs), or a VxLAN network identifier (VNI). In this way the path selection policy can be determined for a given group of sender and receiver, or per application, or using a combination of both.

Figure 2:
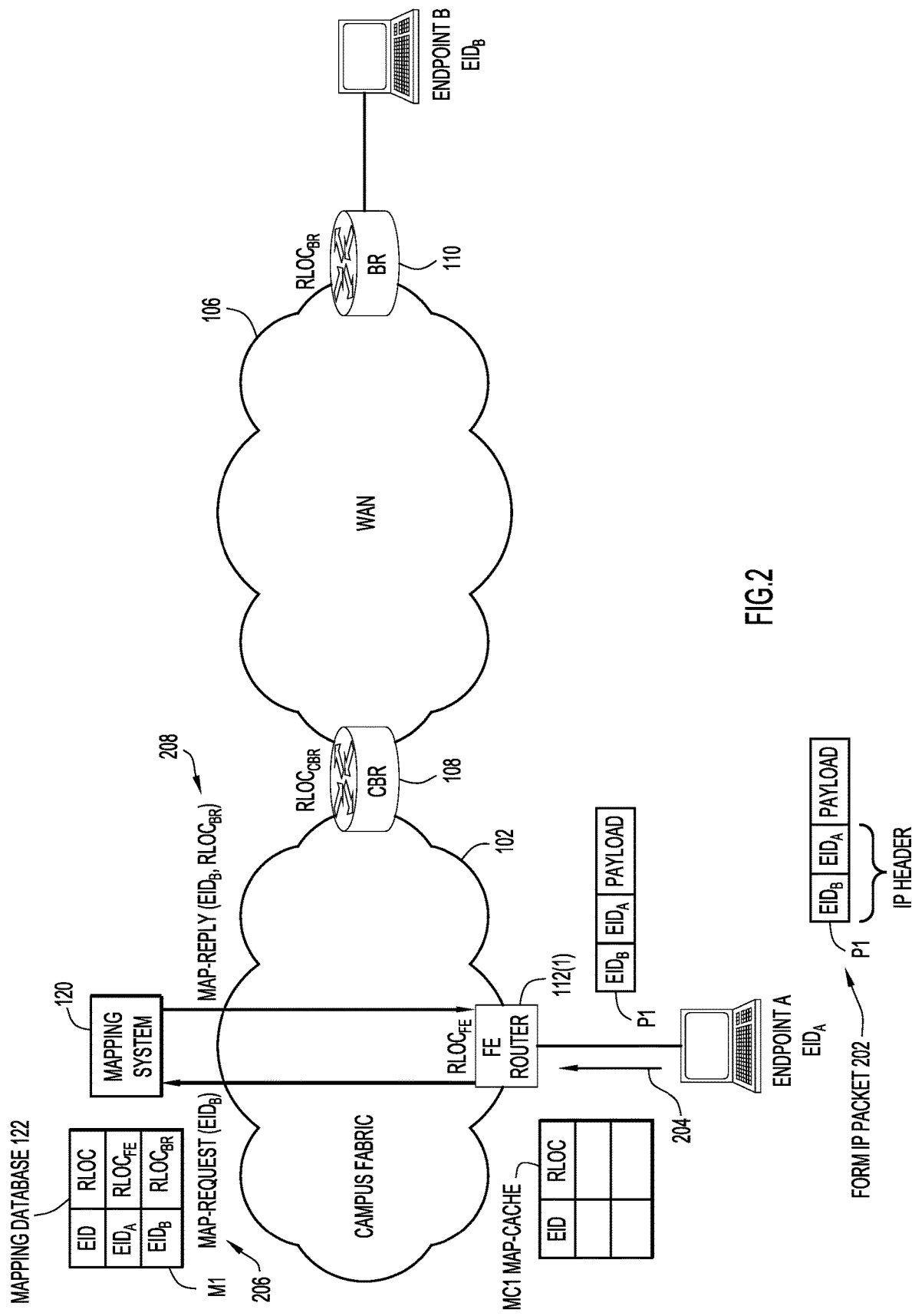
FIG. 2 is an illustration of initial stages of a method of sending an unencrypted Internet Protocol (IP) packet between endpoint devices in the enterprise network system, according to an example embodiment.
Figure 3:
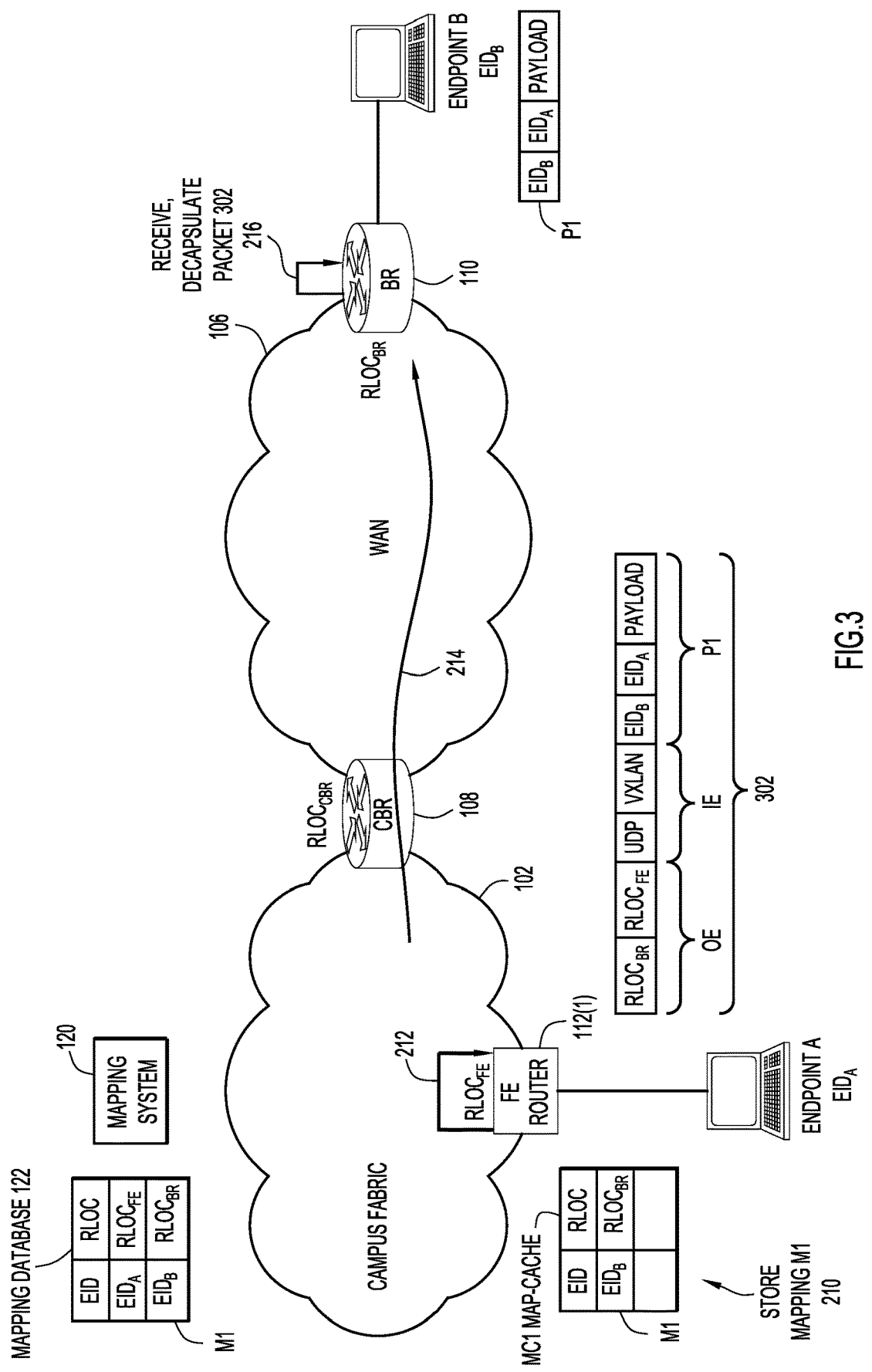
FIG. 3 is an illustration of final stages of the method of sending the unencrypted IP packet between the endpoint devices, according to an example embodiment.

With reference to FIGS. 2 and 3, there are shown sequential illustrations of a method of sending an IP packet from endpoint A to endpoint B in enterprise network system 100 in unencrypted form. In FIGS. 2 and 3, router 112(N), branch network 104, and the multiple WAN paths shown in FIG. 1 are omitted simply for clarity.

With reference to FIG. 2, At 202, endpoint A forms an IP packet P1 destined for endpoint B. IP packet P1 includes an IP header with $EID_B$ as destination and $EID_A$ as source. Endpoint A sends IP packet P1 to FE router 112(1).

At 204, FE router 112(1) receives IP packet P1 from endpoint A. FE router 112(1) includes a local map-cache MC1 having entries used to forward IP packet P1 to BR 110, to which endpoint destination $EID_B$ (i.e., endpoint B) is connected. Initially map-cache MC1 is empty.

Accordingly, at 206, FE router 112(1) sends to mapping system 120 a LISP Map-Request ($EID_B$) for a network location of/corresponding to endpoint destination $EID_B$ indicated in the Map-Request.

At 208, upon receiving Map-Request ($EID_B$), mapping system 120 uses endpoint destination $EID_B$ as an index to retrieve from mapping database 122 an $EID_B$-to-$RLOC_{BR}$ mapping M1, i.e., that maps $EID_B$ to its respective network location $RLOC_{BR}$. Mapping system 120 sends to FE router 112(1) a LISP Map-Reply ($EID_A$, $RLOC_{BR}$) including mapping M1.

Turning to FIG. 3, at 210, upon receiving from mapping system 120 Map-Reply ($EID_B$, $RLOC_{BR}$) including mapping M1, FE router 112(1) stores in map-cache MC1 the mapping M1 (i.e., mapping $EID_B$-$RLOC_{BR}$). Accordingly, all subsequent IP packets directed from endpoint A to endpoint B may be encapsulated for routing to endpoint B without requiring further Map-Requests to mapping system 120.

At 212, using the mapping M1, FE router 112(1) encapsulates IP packet P1 for routing of the IP packet to destination BR 110. In the example of FIG. 3, FE router 112(1) encapsulates IP packet P1 at least with an inner encapsulation (IE) including a VxLAN header and a User Datagram Protocol (UDP) header, and further encapsulates the result with an outer encapsulation (OE) including destination location $RLOC_{BR}$ and source $RLOC_{FE}$, to produce a tunnel packet 302, as shown in FIG. 3.

At 214, FE router 112(1) forwards tunnel packet 302 to BR 110 through campus fabric 102, CBR 108, and WAN 106.

At 216, upon receiving tunnel packet 302, BR 110 decapsulates the tunnel packet to recover original IP packet P1, and forwards the IP packet to destination endpoint B.

The method of FIGS. 2 and 3 sends IP packet P1 across WAN 106 as clear-text, i.e., in an unencrypted form. More typically, however, enterprise network system 100 sends IP packet P1 across WAN 106 in an encrypted form, and BR 110 decrypts the encrypted IP packet received from the WAN to recover the original IP packet, and forwards it to endpoint B. Moreover, before sending the encrypted IP packet across WAN 106, CBR 108 performs WAN path selection. That is, CBR 108 selects a best WAN path from among multiple candidate WAN paths for routing of the encrypted IP packet across WAN 106 to BR 110. CBR 108 selects the best WAN path according to a service level agreement (SLA) or other policy requirements (collectively referred to as a "WAN path selection policy"). WAN path selection may be based on metadata, including, but not limited to, a VxLAN network identifier (VNI) and a security group tag (SGT) in a VxLAN header (e.g., encapsulation of IP packet P1), and/or Quality-of-Service (QoS) indicators from an IP header of the IP packet.

Figure 4:
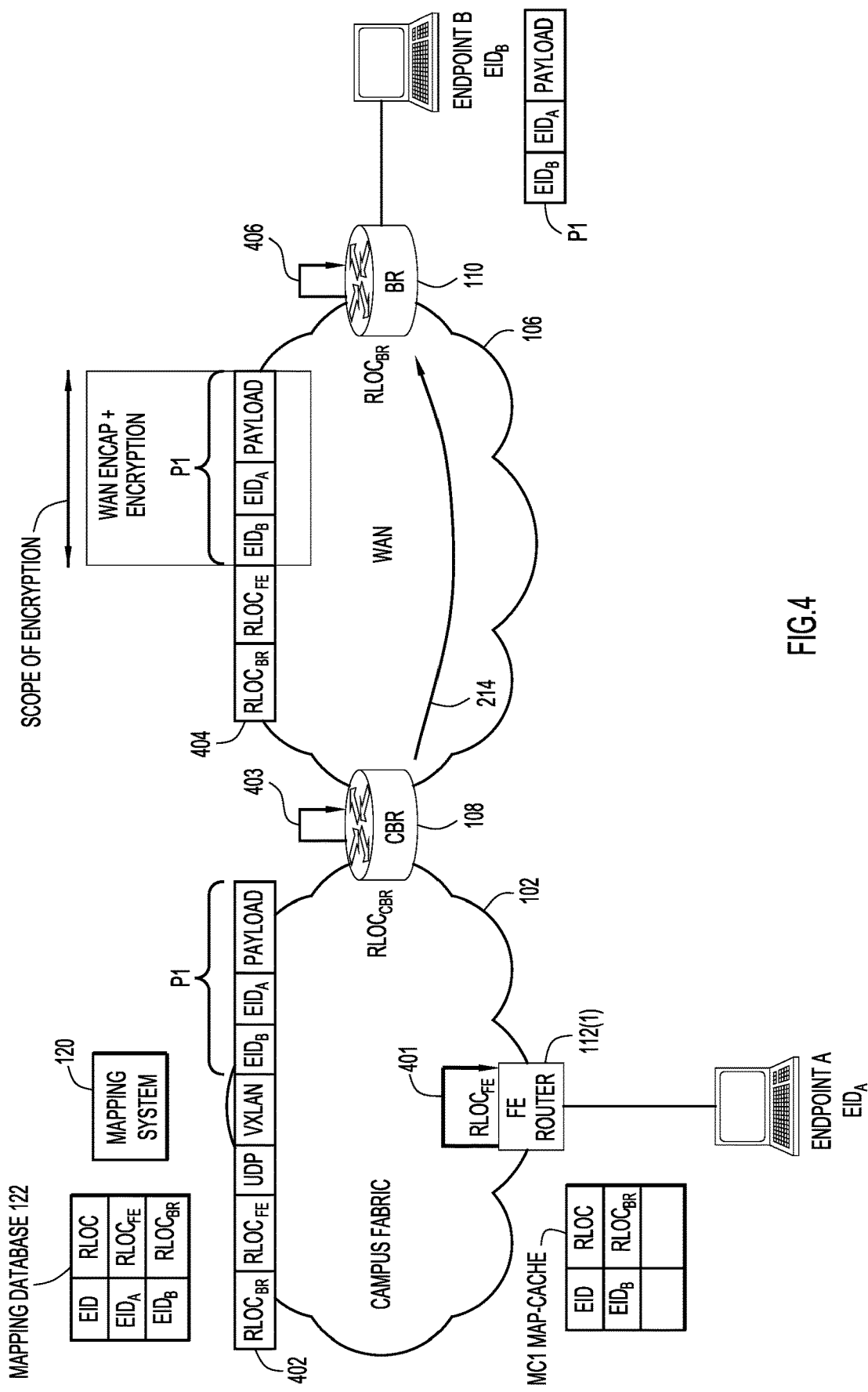
FIG. 4 is an illustration of a first method of sending an encrypted IP packet across a WAN of FIG. 1, according to an example embodiment.

With reference to FIG. 4, there is shown an illustration of a first method of sending an IP packet from endpoint A to endpoint B in enterprise network system 100 in encrypted form. At 401, in accordance with instructions received from mapping system 120, FE router 112(1) encapsulates original IP packet P1 from endpoint A for direct, tunneled delivery to CBR 108, not for direct delivery to BR 110. Thus, FE router 112(1) produces an unencrypted, encapsulated packet 402 and forwards it to CBR 108. In turn, at 403, CBR 108 decapsulates, encrypts, and re-encapsulates original IP packet P1, to produce encrypted encapsulated packet 404 in a format suited for delivery to BR 110 across WAN 106. At 405, CBR 108 forwards encrypted encapsulated packet 404 to BR 110. At 406, upon receiving the encrypted, encapsulated packet 404 from WAN 106, BR 110 decapsulates and decrypts the encapsulated, encrypted packet, and delivers the resulting original IP packet P1 to endpoint B.

Figure 5:
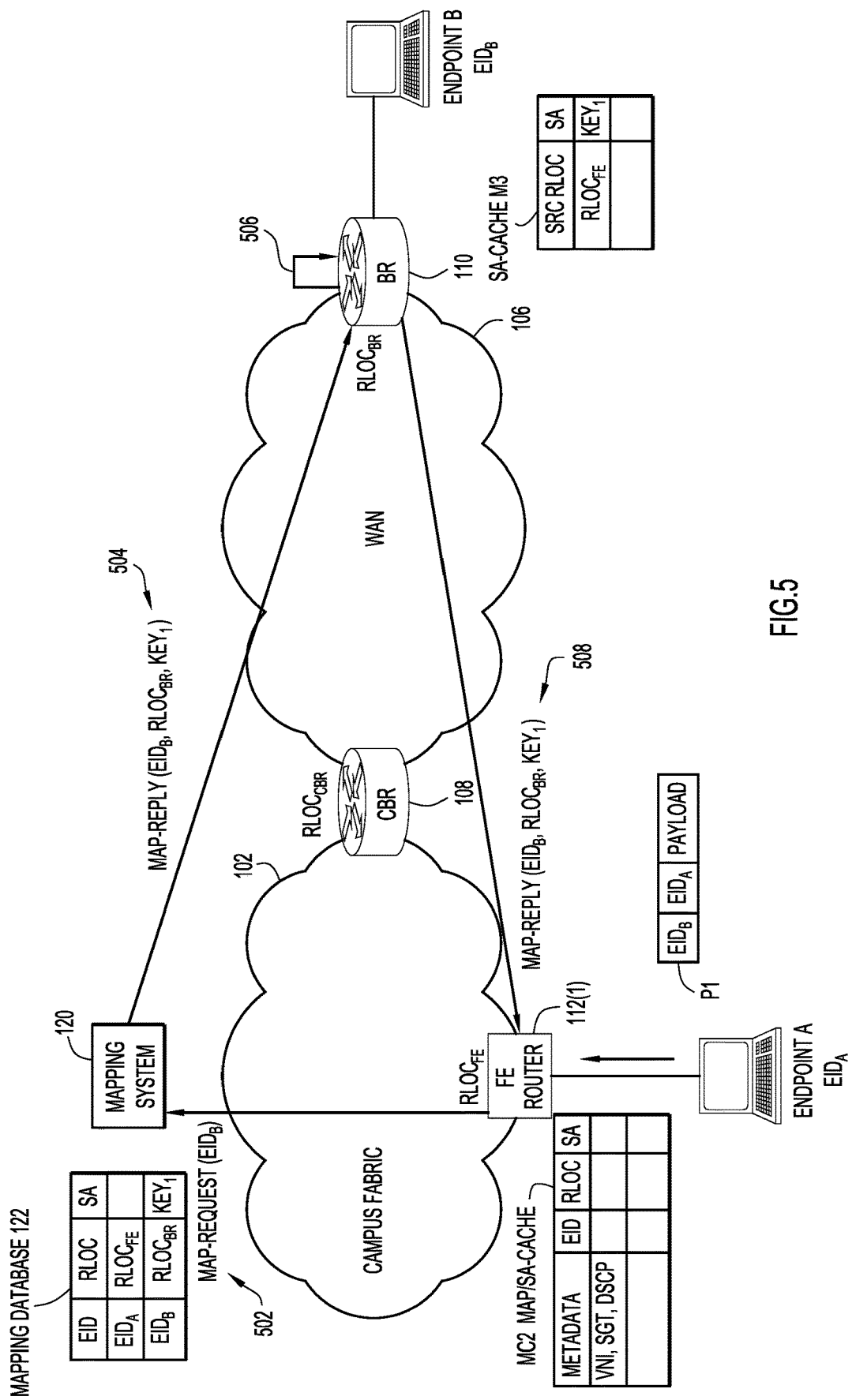
FIG. 5 is an illustration of initial stages of a second method of sending an encrypted IP packet across the WAN, according to an example embodiment.
Figure 6:
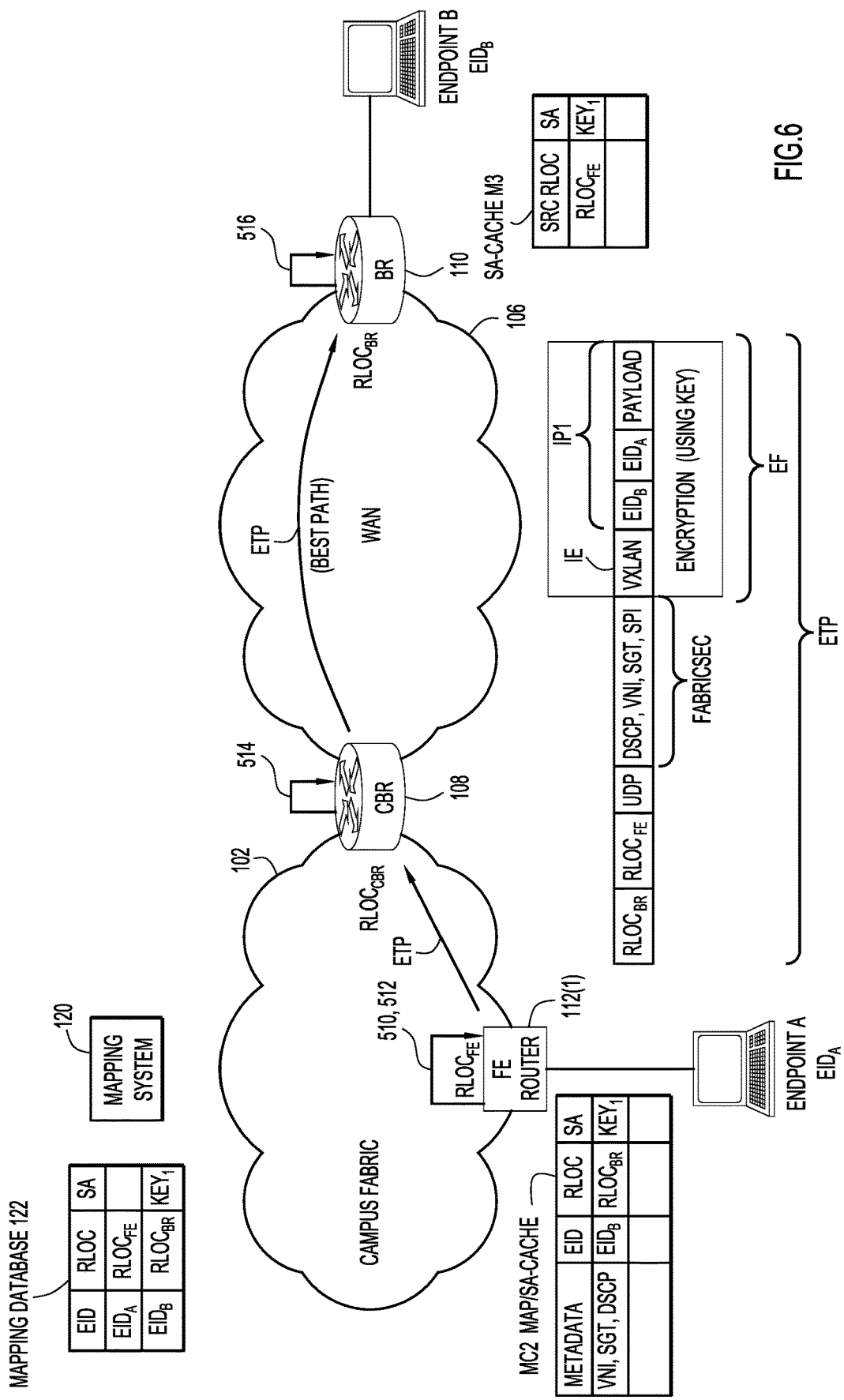
FIG. 6 is an illustration of a final stages of the second method of sending the encrypted IP packet across the WAN, according to an example embodiment.

With reference to FIGS. 5 and 6, there are shown sequential illustrations of a second method of sending an IP packet from endpoint A to endpoint B in encrypted form across WAN 106, with WAN path selection at CBR 108 based on metadata, according to an embodiment. In FIGS. 5 and 6, router 112(N), branch network 104, and the multiple WAN paths shown in FIG. 1 are omitted simply for clarity. The second method uses single (one time only), end-to-end encryption of IP packet P1 from FE router 112(1) to BR 110 via WAN 106. The second method augments mapping database 122 with security association (SA) information mapped to EID and RLOC entries stored in the mapping database. The SA information includes cryptographic material, such as encryption keys (e.g., $key_1$) and corresponding security parameter indexes (SPIs), used to encrypt traffic from FE router 112(1) to BR 110 end-to-end, completely. Also, FE router 112(1) includes an augmented map/SA-cache MC2, which includes: (i) the EID-RLOC mappings mentioned above; (ii) SA information from mapping database 122 and used by FE router 112(1) to encrypt the traffic at FE router 112(1); and (iii) metadata to be sent by the FE router 112(1) to CBR 108 and that is used by the CBR to perform WAN path selection, as described below. That is, the metadata includes one or more path selectors upon which WAN path selection may be based.

Beginning with FIG. 5, at 502, upon receiving original IP packet IP1 destined for endpoint B, FE router 112(1) sends to mapping system 120 a Map-Request ($EID_B$) to ask for (i) the destination RLOC (i.e., $RLOC_{BR}$) corresponding to the destination endpoint $EID_B$ for endpoint B, and (ii) SA information to be used to singly encrypt IP packet IP1 end-to-end, i.e., from the FE router to BR 110, without decryption or re-encryption along the way.

At 504, upon receiving the Map-Request, mapping database 120 retrieves the requested information from database 122 and sends the retrieved information to BR 110 in a Map-Reply ($EID_B$, $RLOC_{BR}$, $key_1$), which includes endpoint ID $EID_B$, router locator $RLOC_{BR}$, and encryption key $key_1$ (and an SPI) to be used by FE router 112(1) to encrypt packet IP1 and by BR 110 to decrypt the encrypted IP packet.

At 506, upon receiving the Map-Reply, BR 110 stores in its own SA-cache MC3 the SA information from the Map-Reply to be used to decrypt incoming encrypted packets received from FE router 112(1) over WAN 106.

At 508, BR 110 forwards the Map-Reply to FE router 112(1). In another embodiment, mapping system 120 may send a copy of the Map-Reply directly to FE router 112(1) instead of indirectly to the FE router via BR 110.

Turning to FIG. 6, at 510, FE router 112(1) performs the following operations:

a. Upon receiving the Map-Reply from BR 110, the FE router copies information from the Map-Reply to Map/SA-cache MC2 (i.e., populates the Map/SA-cache) with destination $EID_B$, corresponding destination $RLOC_{BR}$, and $key_1$ to be used to encrypt IP packet IP1 to be directed to BR 110.

b. The FE router determines the type of metadata (e.g., one or more of VNI, SGT, DSCP, and so on) to be used by CBR 108 for path selection. For example, the FE router accesses a path selection database stored locally or accessible from elsewhere in enterprise network system 100 that indicates the type of path selection to be performed by CBR 108 and/or the corresponding path selectors to be included in the metadata.

c. The FE router generates metadata (e.g., one or more of VNI, SGT, DSCP, and so on) as indicated in operation 510(b), and stores the metadata in Map/SA-cache MC2. In an example, to generate the metadata, FE router may copy to Map/SA-cache MC2 path selectors from an IP header of IP packet P1, and/or from inner encapsulation (e.g., from a VxLAN header) to be added (e.g., prepended) to the IP packet prior to encryption.

At 512, FE router 112(1) performs the following operations:

a. Adds to the IP packet inner encapsulation IE (such as a VxLAN header), if any. The FE router encrypts the IP packet along with the inner encapsulation, if any, using/based on the SA information, e.g., keys and the SPI, stored in MAP/SA-cache MC2, to produce an encrypted field EF. FE router 112(1) protect the IP packet using any known or hereafter developed security protection technique, such as Datagram Transport Layer Security (DTLS), IP Security (IPSec)/Encapsulating Security Payload (ESP), or Algebraic Eraser (AEDH) security, for example.

b. Copies the metadata (path selectors) from Map/SA-cache MC2 into a special clear-text fabric security "FabricSec" header or field, which also includes some of the SA information (e.g., the SPI) and adds (e.g., prepends) the clear-text FabricSec header including the metadata and the SA information to the encrypted field, i.e., outside of the encrypted field. Thus, the metadata and the SA information in the FabricSec header is in clear-text, i.e., is unencrypted. The FabricSec header may also be referred to as a "crypto" header.

c. Adds clear-text outer encapsulation to the encrypted field and the FabricSec header, to produce an encrypted tunnel packet ETP. The outer encapsulation includes information to ensure forwarding of the encrypted tunnel packet to BR 110 via CBR 108 and then WAN 106. Outer encapsulation may include a UDP header and Ethernet encapsulation, as shown in FIG. 6, for example.

FE router 112(1) forwards encrypted tunnel packet ETP to BR 110 via CBR 108 and WAN 106.

At 514, upon receiving tunnel packet ETP, CBR 108 accesses the clear-text metadata in the FabricSec header of the encrypted tunnel packet, and selects a best WAN path among multiple candidate WAN paths based on the one or more (clear-text) path selectors of the metadata. CBR 108 forwards to BR 110 encrypted tunnel packet ETP over WAN 106 using the best path and based on the clear-text outer encapsulation of the encrypted tunnel packet.

At 516, upon receiving encrypted tunnel packet ETP, BR 110 performs the following operations:
 a. Using the tuple [SPI, $RLOC_{BR}$] in encrypted tunnel packet ETP as an index into SA-cache MC3, accesses the SA information, including $key_1$, stored in the SA-cache.
 b. Removes the outer encapsulation and the FabricSec header from encrypted tunnel packet ETP (i.e., decapsulates the encrypted tunnel packet), to recover encrypted field EF.
 c. Decrypts encrypted field EF using the SA information, including $key_1$, to recover original IP packet IP1 with the inner encapsulation, if any.
 d. Removes the inner encapsulation, if any, and forwards original IP packet IP1 to destination endpoint B.

Figure 7A:
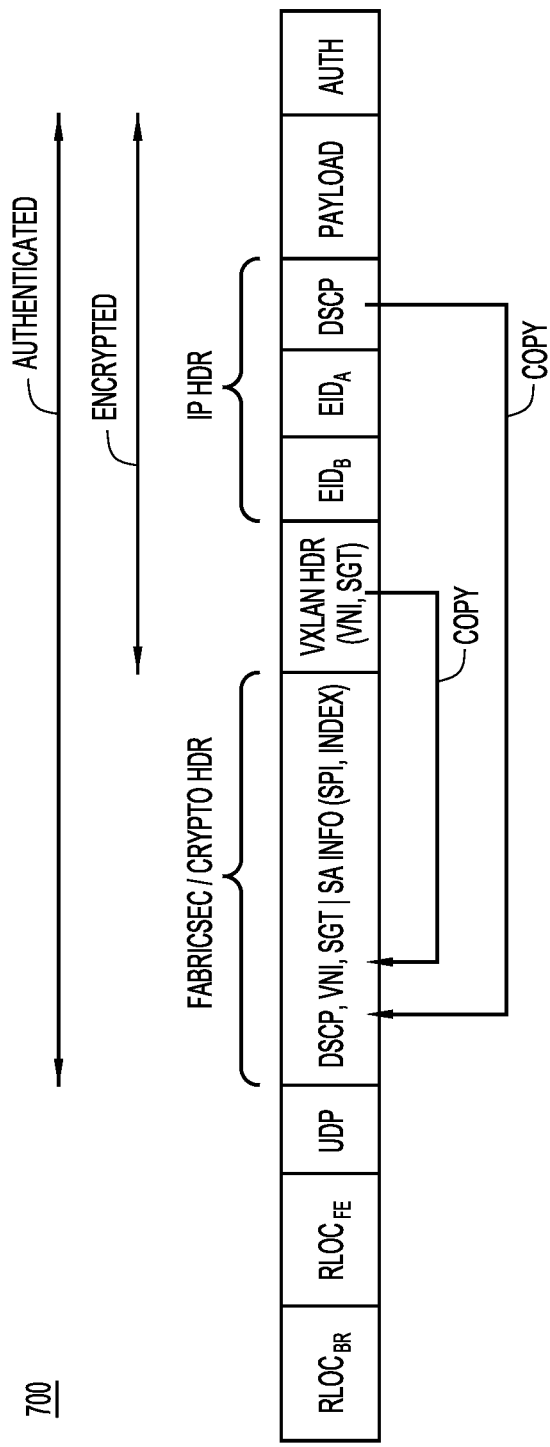
FIG. 7A is an illustration of a format of an encrypted tunnel packet generated by a fabric edge (FE) (access) router of the campus network, according to an example embodiment.

With reference to FIG. 7A, there is an illustration of an example encrypted tunnel packet 700 corresponding to encrypted tunnel packet ETP that may be generated by FE router 112(1) at operation 512(c). Moving left-to-right in FIG. 7A, packet 700 includes clear-text outer encapsulation $RLOC_{BR}$, $RLOC_{FE}$, and a UDP header. Packet 700 also includes a clear-text FabricSec or crypto header including:
 a. One or more path selectors VNI and SGT copied from inner encapsulation, e.g., a VxLAN header, prior to encryption of the inner encapsulation, and DSCP copied from an IP header prior to encryption of the IP header.
 b. SA information, such as an SPI and an index (e.g., for IP Sec, the SA information includes an ESP field).

Following the FabricSec header, packet 700 further includes:
 a. Encrypted inner encapsulation, VxLAN header.
 b. An encrypted IP packet, including the IP header and payload.
 c. A terminal crypto field, such as an authentication field, e.g., an integrity check value (ICV), which may be encrypted or unencrypted.

Figure 7B:
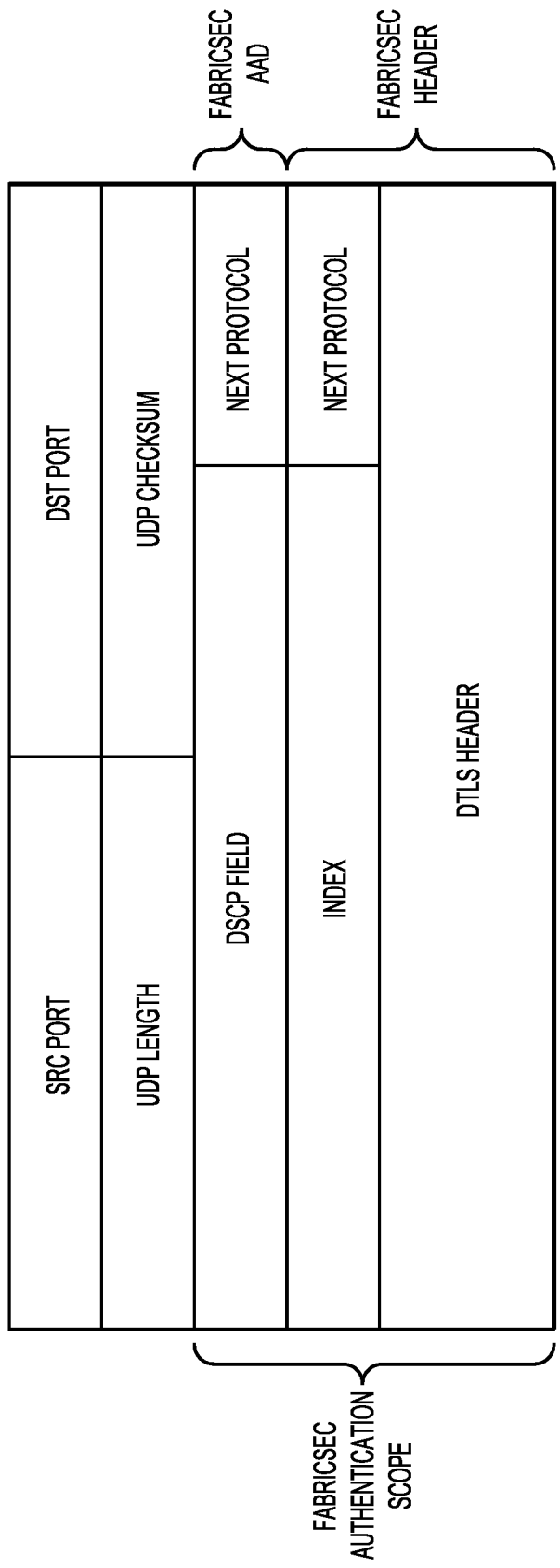
FIG. 7B is an illustration of a Fabric Security (FabricSec) header for an encrypted tunnel packet that includes a Differentiated Services Code Point (DSCP) field as a path selector, according to an example embodiment.

With reference to FIG. 7B, there is an illustration of an example FabricSec header 750 that includes as a path selector a DSCP field, and that results from encrypting an IP packet with an encryption algorithm that performs Authenticated Encryption with Additional Authenticated Data (AEAD), such as Advanced Encryption Standard (AES)-Galois/Counter Mode (GCM) GCM in Transport Layer Security (TLS)/DTLS.

Figure 8:
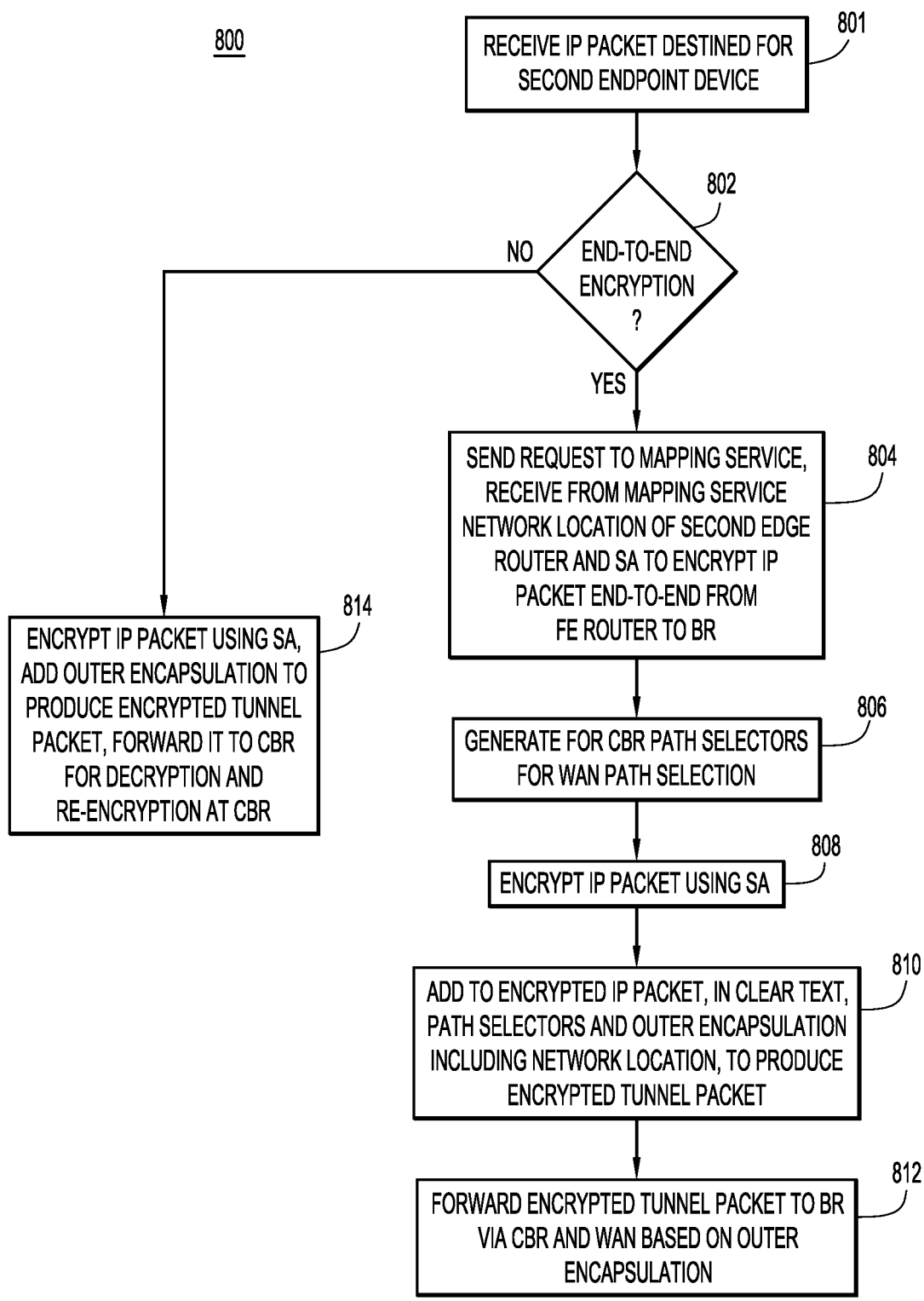
FIG. 8 is a flowchart of a method of selectively performing single, end-to-end encryption implemented by the FE router, according to an example embodiment.

With reference to FIG. 8, there is a flowchart of an example method 800 of selectively performing single, end-to-end encryption performed by FE router 112(1) of campus network 102, which includes CBR 108 to communicate with BR 110 over WAN 106. More generally, FE router 112(1), CBR 108, BR 110, campus network 102, and branch network 104 may be referred to as an "access router," a first edge router," a "second edge router," a "first enterprise network," and a "second enterprise network," respectively. Method 800 summarizes operations described above from the perspective of FE router 112(1).

At 801, FE router 112(1) receives from first endpoint A an IP packet destined for second endpoint B, which is configured to communicate with BR 110 directly, or indirectly through branch network 104.

At 802, FE router 112(1) determines whether to perform single (i.e., one-time only), end-to-end encryption from the FE router to BR 110 or only limited encryption from the FE router to CBR 108. Operation 802 may base the determination/decision on whether FE router 112(1) has sufficient cryptograph resources to perform the single, end-to-end encryption. For example, while a current number of SAs stored in FE router 112(1) is equal to or below a predetermined threshold number of SAs, FE router 112(1) may perform single, end-to-end encryption. On the other hand, when the current number of SAs exceeds the predetermined number of SAs, FE router may perform only limited encryption instead of the single, end-to-end encryption.

If the single, end-to-end encryption is to be performed, FE router 112(1) performs next operations 804-812, described below. On the other hand, if only limited encryption is to be performed, FE router 112(1) performs operation 814, also described below.

At 804, FE router 112(1) sends to map service 120 a request for information including a network location of BR 110 and an SA with which to perform single, end-to-end encryption from the FE router to BR 110. FE router 112(1) receives the information from map service 120 directly or indirectly, e.g., via BR 110.

At 806, FE router 112 determines which path selectors to generate for WAN path selection based on a security policy accessible to the FE router, and generates the determined path selectors for CBR 108. FE router may copy to local memory the path selectors from the IP packet (e.g., a DSCP field) and/or from inner encapsulation for the IP packet, such as a VxLAN header (e.g., VNI and/or SGT).

At 808, FE router 112 encrypts the IP packet and inner encapsulation, if any, using the SA.

At 810, FE router 112(1) adds to the encrypted IP packet and the encrypted inner encapsulation in clear text (i.e., in unencrypted form) the FabricSec/crypto header (including path selectors and SA information needed for decryption, such as an IP Sec ESP field) and outer encapsulation including the network location, to produce an encrypted tunnel packet.

At 812, FE router 112(1) forwards the encrypted tunnel packet to BR 110 via CBR 108 and WAN 106 based on the outer encapsulation.

At 814, FE router 112(1) encrypts the IP packet using the SA, adds outer encapsulation to the encrypted IP packet, such as a VxLAN header, to produce an encrypted tunnel packet, and forwards the encrypted tunnel packet to the first edge router for decryption, re-encryption, and subsequent forwarding to BR 110.

Figure 9:
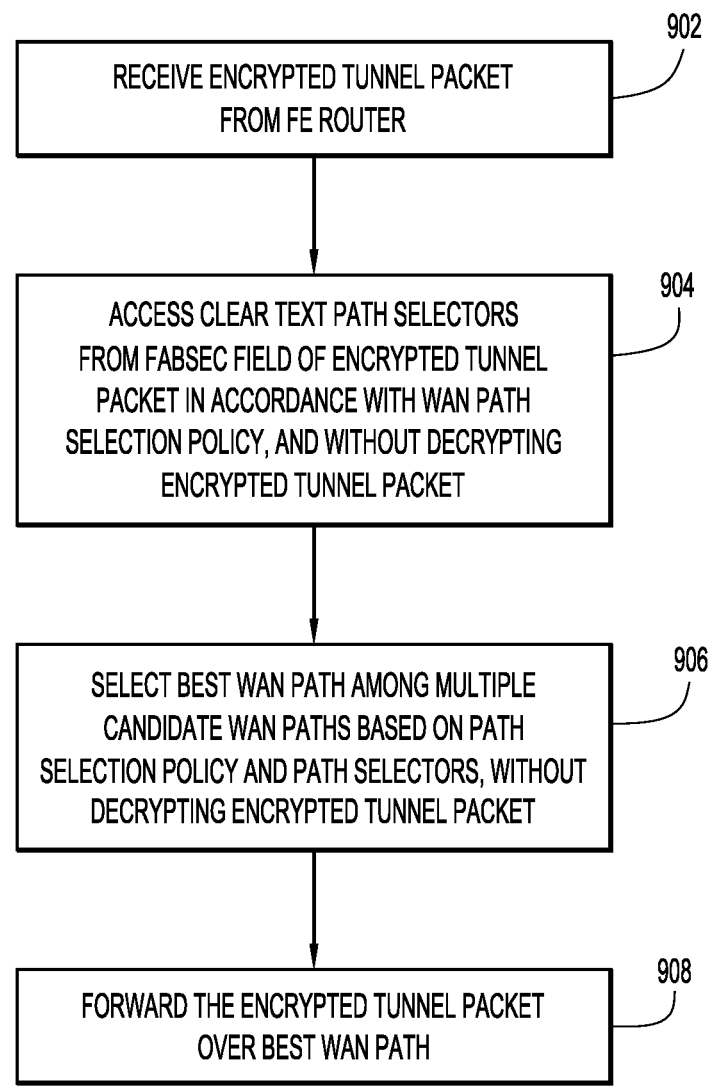
FIG. 9 is a method of handling an encrypted tunnel packet performed by a campus branch router (CBR) of the enterprise network system, according to an example embodiment.

With reference to FIG. 9, there is an example method 900 of handling encrypted tunnel packets from FE router 112(1) performed by CBR 108. CBR 108 has access to predetermined path selection policy that indicates types of WAN path selection to be performed by the CBR and that indicates types of WAN path selectors that may be used for the WAN path selection. For example, the path selection policy may indicate WAN path selection based on one or more of Quality-of-Service (QoS) (e.g., the DSCP field), VNI, SGT, and so on. CBR 108 also has access to indications of multiple candidate WAN paths across which WAN path selection is to be made. The candidate WAN paths may be indicated as next hops in a series of hops across WAN 106.

At 902, CBR 108 receives an encrypted tunnel packet (e.g., encrypted tunnel packet ETP) from FE router 112(1) over campus network 102.

At 904, CBR 108 accesses one or more clear text path selectors from the FabricSec header of the encrypted tunnel packet in accordance with the WAN path selection policy, and without decrypting the encrypted tunnel packet.

At 906, CBR 108 selects a best wide area network path among the multiple candidate WAN paths from the CBR to BR 110 across WAN 106 based on the path selection policy and the one or more path selectors, without decrypting the encrypted tunnel packet.

At 908, CBR 108 forwards the encrypted tunnel packet to BR 110 second edge router over the best wide area network path.

In an example of method 900, CBR 108 performs WAN path selection based on QoS and has access to candidate WAN paths each offering a respective QoS. CBR 108 determines the respective QoS of each candidate WAN path, and selects as the best WAN path the candidate WAN path having a respective determined QoS closest to the QoS indicated in the DSCP field of the FabricSec header.

Figure 10:
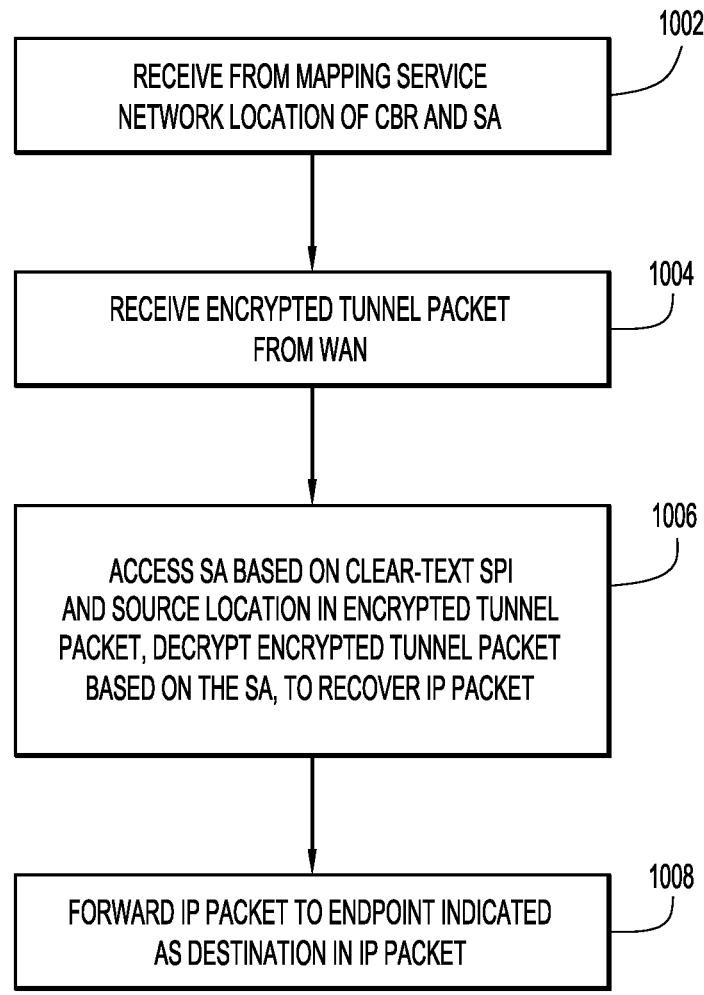
FIG. 10 is a method of handling the encrypted tunnel packet performed by a branch router (BR) of the enterprise network system, according to an example embodiment.

With reference to FIG. 10, there is an example method 1000 of handling encrypted tunnel packets performed by BR 110.

At 1002, BR 110 receives from mapping system 120 a reply (e.g., Map-Reply) to a request (e.g., Map-Request) for information that was sent from FE 112(1) to the mapping system, as described above. The reply includes a network location of CBR 108 and an SA including an encryption key (e.g., $key_1$) and an SPI.

At 1004, BR 110 receives from WAN 106 an encrypted tunnel packet.

At 1006, BR 110 accesses the clear-text SA information (e.g., SPI) in the FabricSec/crypto header of the encrypted tunnel packet. BR 110 accesses the SA (i.e., encryption key) stored in the local cache of the BR based on (i) the SA information from the FabricSec/crypto header, and (ii) a source location in outer encapsulation of the encrypted tunnel packet, and decrypts the encrypted tunnel packet based on the SA, to recover an original IP packet from the encrypted tunnel packet.

At 1008, BR 110 forwards the IP packet to an endpoint indicated as a destination in the IP packet.

Figure 11:
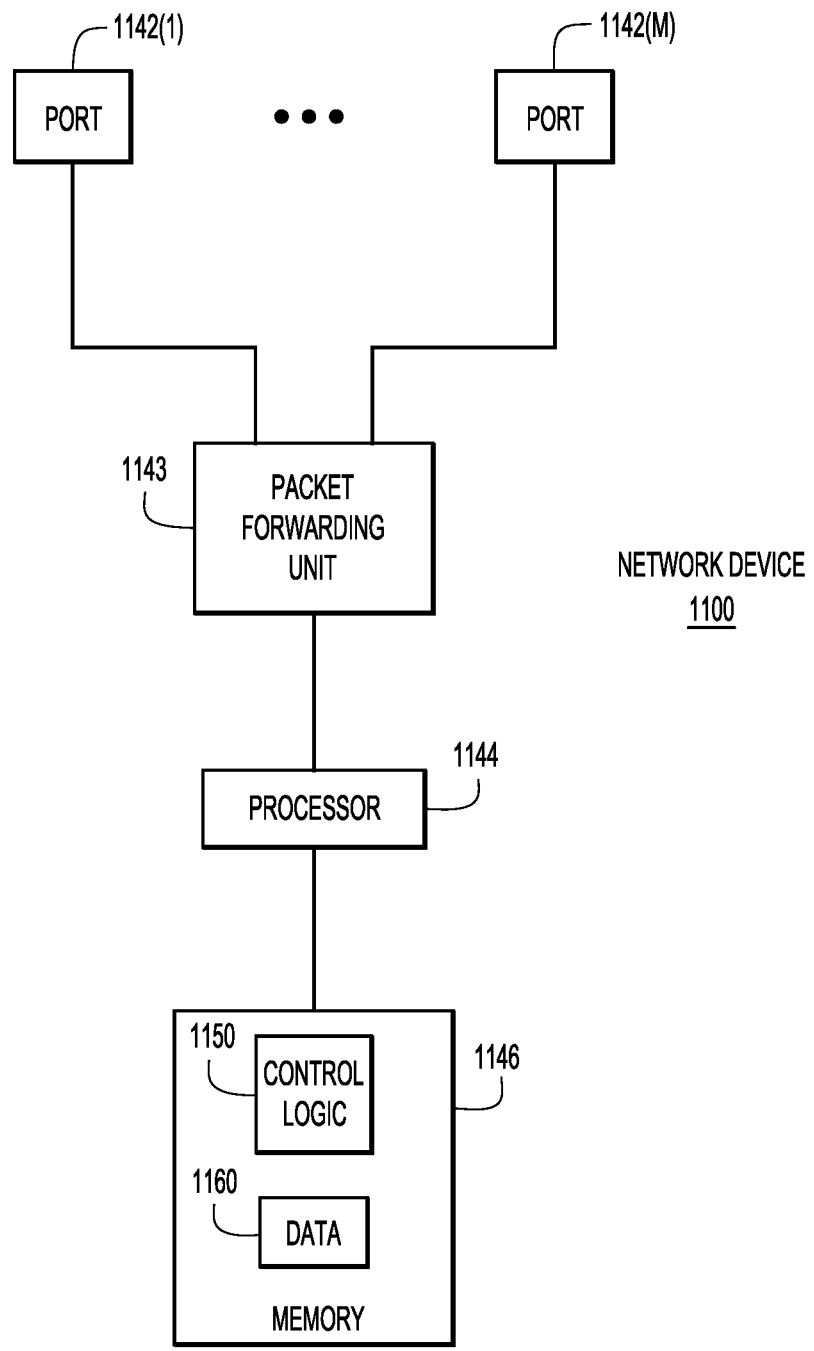
FIG. 11 is a high-level block diagram of a network device representative of the FE router, the CBR, and the BR, according to an example embodiment.

With reference to FIG. 11, there is a block diagram of an example network device 1100, representative of each of FE router 112(1), CBR 108, and BR 110. Network device 1100 comprises a network interface unit having a plurality of network input/output (I/O) ports 1142(1)-1142(M) to send traffic to one or more networks (e.g., enterprise networks 102 and 104, and WAN 106) and receive traffic from the networks, a packet forwarding/processing unit 1143, a network processor 1144 (also referred to simply as "processor"), a management port 1145 to exchange control messages with other network devices and an administration function, and a memory 1146. The packet forwarding/processing unit 1143 is, for example, one or more application specific integrated circuits (ASICs) that include packet buffers, packet queues, and other control logic for performing packet forwarding operations. The processor 1144 may include multiple processors, which may be implemented as software or hardware processors. For example, processor 1144 may include a microcontroller or microprocessor that is configured to perform higher level controls of network device 1100. To this end, the memory 1146 stores software instructions that, when executed by the processor 1144, cause the processor 1144 to perform a variety of operations including operations described herein. For example, the memory 1146 stores instructions for control logic 1150 to perform operations described herein including methods 800, 900, and 1000, including cryptographic encryption/decryption and authentication functions, described above. Control logic 1150 may also include logic components in packet forwarding unit 1143. Memory 1146 also stores data 1160 used and generated by logic 1150. Such data may include security associations, security policies, path selection policies, encryption keys, metadata including path selectors, data packets and so on, as described above.

Figure 12:
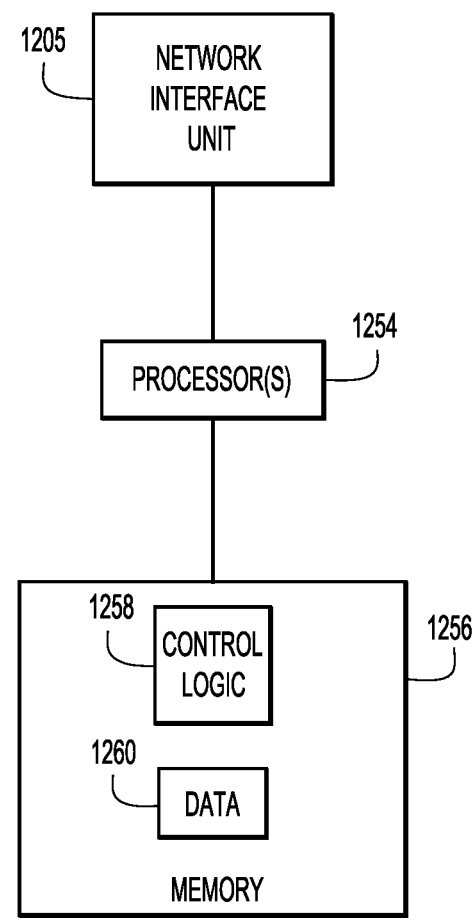
FIG. 12 is a block diagram of a computer device, such as a server device, representative of a mapping server and associated mapping database of the enterprise network system, according to an example embodiment.

With reference to FIG. 12, there is a block diagram of an example computer device 1200, such as a server device representative of key mapping system 120. Computer device 1200 includes network interface unit 1205 to communicate with a wired and/or wireless communication network. Computer device 1200 also includes a processor 1254 (or multiple processors, which may be implemented as software or hardware processors), and memory 1256. Network interface unit 1205 may include an Ethernet card with a port (or multiple such devices) to communicate over wired Ethernet links and/or a wireless communication card with a wireless transceiver to communicate over wireless links.

Memory 1256 stores instructions for implementing methods described herein. Memory 1256 may include read only memory (ROM), random access memory (RAM), magnetic disk storage media devices, optical storage media devices, flash memory devices, electrical, optical, or other physical/tangible (non-transitory) memory storage devices. The processor 1254 is, for example, a microprocessor or a microcontroller that executes instructions stored in memory. Thus, in general, the memory 1256 may comprise one or more tangible computer readable storage media (e.g., a memory device) encoded with software comprising computer executable instructions and when the software is executed (by the processor 1254) it is operable to perform the operations described herein. For example, memory 1256 stores control logic 1258 to perform operations for key mapping system 120 as described herein. The memory 1256 may also store data 1260 (e.g., database 122) used and generated by logic 1258, such as SAs and EID-RLOC mappings.

In summary, embodiments described above present SD-WAN solutions that provide dynamic path selection and security over the WAN portion of an enterprise network. The embodiments (1) extend the scope of an enterprise Map Server to map location of endpoints across campus and branches, (2) dynamically adapt the encrypted tunnel topology to optimize the use of encryption resources in the enterprise fabric, and (3) use explicit/clear-text metadata tagging (with path selectors) to determine a path selection policy at the fabric edge (access router), while dynamically enforcing the path selection policy at the SD-WAN edge. This provides a secure end-to-end enterprise fabric domain where the flexibility of the campus access services is combined with the most effective dynamic path selection over the WAN while providing end-to-end confidentiality/integrity to the overlay. The embodiments decouple the end-to-end encryption function of an enterprise fabric, from the SD-WAN dynamic path optimization function. This affords scalable end-to-end confidentiality/integrity across an enterprise fabric (from the enterprise fabric access to the branches) while still allowing fine grain dynamic path optimization over the WAN.

In one form, a method is provided comprising: at an access router of an enterprise network including a first edge router configured to communicate with a second edge router over a wide area network: receiving from a first endpoint device an Internet Protocol (IP) packet destined for a second endpoint device configured to communicate with the second edge router; receiving from a mapping service a network location of the second edge router and a security association to encrypt the IP packet from the access router to the second edge router; generating for the first edge router one or more path selectors upon which wide area network path selection is based; encrypting the IP packet using the security association; adding to the encrypted IP packet, in clear text, the one or more path selectors and outer encapsulation including the network location, to produce an encrypted tunnel packet; and forwarding the encrypted tunnel packet to the second edge router via the first edge router and the wide area network based on the outer encapsulation.

In another form, an apparatus is provided comprising: network ports configured to send data to and receive data from an enterprise network including a first edge router configured to communicate with a second edge router over a wide area network; and a processor coupled to the network ports and configured to: receive from a first endpoint device an Internet Protocol (IP) packet destined for a second endpoint device configured to communicate with the second edge router; receive from a mapping service a network location of the second edge router and a security association to encrypt the IP packet from the access router to the second edge router; generate for the first edge router one or more path selectors upon which wide area network path selection is based; encrypt the IP packet using the security association; adding to the encrypted IP packet, in clear text, the one or more path selectors and outer encapsulation including the network location, to produce an encrypted tunnel packet; and forward the encrypted tunnel packet to the second edge router via the first edge router and the wide area network based on the outer encapsulation.

In yet another form, a computer readable medium is provided. The computer readable medium stores instructions that, when executed by a processor of an access router of an enterprise network, wherein the enterprise network includes a first edge router configured to communicate with a second edge router over a wide area network, cause the processor to perform: receiving from a first endpoint device an Internet Protocol (IP) packet destined for a second endpoint device configured to communicate with the second edge router; receiving from a mapping service a network location of the second edge router and a security association to encrypt the IP packet from the access router to the second edge router; generating for the first edge router one or more path selectors upon which wide area network path selection is based; encrypting the IP packet using the security association; adding to the encrypted IP packet, in clear text, the one or more path selectors and outer encapsulation including the network location, to produce an encrypted tunnel packet; and forwarding the encrypted tunnel packet to the second edge router via the first edge router and the wide area network based on the outer encapsulation.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at an access router of an enterprise network including a first edge router configured to communicate with a second edge router over a wide area network:
        receiving from a first endpoint device an Internet Protocol (IP) packet destined for a second endpoint device configured to communicate with the second edge router;
        receiving from a mapping service a network location of the second edge router and a security association to encrypt the IP packet from the access router to the second edge router;
        determining whether end-to-end encryption from the access router to the second edge router or limited encryption only from the access router to the first edge router is to be performed, and when the end-to-end encryption is to be performed:
            generating for, the first edge router, one or more path selectors upon which wide area network path selection is to be based;
            encrypting the IP packet using the security association, to produce an encrypted IP packet;
            adding to the encrypted IP packet, in clear text, the one or more path selectors and outer encapsulation including the network location, to produce an encrypted tunnel packet; and
            forwarding the encrypted tunnel packet to the second edge router via the first edge router and the wide area network based on the outer encapsulation; and
        when the limited encryption is to be performed, encrypting and encapsulating the IP packet to produce a second encrypted tunnel packet, and forwarding the second encrypted tunnel packet to the first edge router for decryption and re-encryption.

2. The method of claim 1, wherein, when the end-to-end encryption is to be performed, the generating, the encrypting, the adding, and the forwarding result in single, end-to-end, encryption of the IP packet from the access router to the second edge router over the wide area network, and wide area network path selection for the encrypted tunnel packet by the first edge router based on the one or more path selectors without decryption of the encrypted tunnel packet.

3. The method of claim 1, wherein, when the end-to-end encryption is to be performed, the encrypting includes adding to the encrypted IP packet a clear-text crypto field including information from the security association that is used to decrypt the IP packet.

4. The method of claim 1, wherein:
    the generating includes copying a first path selector of the one or more path selectors from an IP header of the IP packet.

5. The method of claim 4, wherein the first path selector includes an IP Differentiated Services Code Point (DSCP) field copied from the IP header of the IP packet.

6. The method of claim 1, wherein, when the end-to-end encryption is to be performed:
    the generating includes copying a first path selector of the one or more path selectors from inner encapsulation for the IP packet;
    the encrypting includes encrypting the IP packet and the inner encapsulation, to produce the encrypted IP packet and encrypted inner encapsulation; and
    the adding includes adding to the encrypted IP packet and the encrypted inner encapsulation, in clear text, the one or more path selectors and the outer encapsulation, to produce the encrypted tunnel packet.

7. The method of claim 6, wherein:
    the inner encapsulation includes a virtual extensible local area network (VxLAN) header; and the copying further includes copying a VxLAN network identifier (VNI) or a security group tag from the VxLAN header as the first path selector.

8. The method of claim 1, further comprising, at the access router, prior to the generating:
accessing a path selection policy; and
determining which of the one or more path selectors to generate based on the path selection policy.

9. The method of claim 1, further comprising, at the access router:
prior to the receiving from the mapping service, sending to the mapping service a request for the network location of the second edge router and the security association,
wherein the receiving from the mapping service includes receiving the network location of the second edge router and the security association either directly or indirectly from the mapping service.

10. The method of claim 1, further comprising, at the first edge router:
receiving the encrypted tunnel packet;
selecting a best wide area network path among multiple candidate wide area network paths from the first edge router to the network location of the second edge router based on the one or more path selectors in clear text without decrypting the encrypted tunnel packet; and
forwarding the encrypted tunnel packet to the network location of the second edge router over the best wide area network path.

11. The method of claim 1, further comprising, at the second edge router:
receiving from the mapping service the security association and a network location of the first edge router;
decrypting the encrypted tunnel packet based on the security association, to recover the IP packet; and
forwarding the IP packet to the second endpoint device.

12. The method of claim 1, wherein:
when the limited encryption is to be performed:
the encrypting includes encrypting the IP packet using the security association; and
the encapsulating includes adding outer encapsulation to the encrypted IP packet, to produce the second encrypted tunnel packet.

13. An apparatus comprising:
a network interface unit of an access router including network ports configured to send data to and receive data from an enterprise network including a first edge router configured to communicate with a second edge router over a wide area network;
a memory; and
a processor coupled to the memory and the network ports and configured to:
receive from a first endpoint device an Internet Protocol (IP) packet destined for a second endpoint device configured to communicate with the second edge router;
receive from a mapping service a network location of the second edge router and a security association to encrypt the IP packet from the access router to the second edge router;
determine whether end-to-end encryption from the access router to the second edge router or limited encryption only from the access router to the first edge router is to be performed, and when the end-to-end encryption is to be performed:
generate, for the first edge router, one or more path selectors upon which wide area network path selection is to be based;
encrypt the IP packet using the security association;
add to the encrypted IP packet, in clear text, the one or more path selectors and outer encapsulation including the network location, to produce an encrypted tunnel packet; and
forward the encrypted tunnel packet to the second edge router via the first edge router and the wide area network based on the outer encapsulation; and
when the limited encryption is to be performed, encrypt and encapsulate the IP packet to produce a second encrypted tunnel packet, and forward the second encrypted tunnel packet to the first edge router for decryption and re-encryption.

14. The apparatus of claim 13, wherein, when the end-to-end encryption is to be performed, the operations to generate, encrypt, add, and forward result in single, end-to-end, encryption of the IP packet from the access router to the second edge router over the wide area network, and wide area network path selection for the encrypted tunnel packet by the first edge router based on the one or more path selectors without decryption of the encrypted tunnel packet.

15. The apparatus of claim 13, wherein, when the end-to-end encryption is to be performed, the processor is configured to encrypt by adding to the encrypted IP packet a clear-text crypto field including information from the security association that is used to decrypt the IP packet.

16. The apparatus of claim 13, wherein:
the processor is configured to generate by copying a first path selector of the one or more path selectors from an IP header of the IP packet.

17. The apparatus of claim 13, wherein the processor is further configured to, when the end-to-end encryption is to be performed:
generate by copying a first path selector of the one or more path selectors from inner encapsulation for the IP packet;
encrypt by encrypting the IP packet and the inner encapsulation, to produce the encrypted IP packet and encrypted inner encapsulation; and
add by adding to the encrypted IP packet and the encrypted inner encapsulation the one or more path selectors and the outer encapsulation, to produce the encrypted tunnel packet.

18. A non-transitory computer readable medium encoded with instructions that, when executed by a processor of an access router of an enterprise network, wherein the enterprise network includes a first edge router configured to communicate with a second edge router over a wide area network, cause the processor to perform:
receiving from a first endpoint device an Internet Protocol (IP) packet destined for a second endpoint device configured to communicate with the second edge router;
receiving from a mapping service a network location of the second edge router and a security association to encrypt the IP packet from the access router to the second edge router;
determining whether end-to-end encryption from the access router to the second edge router or limited encryption only from the access router to the first edge router is to be performed, and when the end-to-end encryption is to be performed:

generating, for the first edge router, one or more path selectors upon which wide area network path selection is to be based;

encrypting the IP packet using the security association;

adding to the encrypted IP packet, in clear text, the one or more path selectors and outer encapsulation including the network location, to produce an encrypted tunnel packet; and forwarding the encrypted tunnel packet to the second edge router via the first edge router and the wide area network based on the outer encapsulation; and when the limited encryption is to be performed, encrypting and encapsulating the IP packet to produce a second encrypted tunnel packet, and forwarding the second encrypted tunnel packet to the first edge router for decryption and re-encryption.

19. The non-transitory computer readable medium of claim 18, wherein the instructions to cause the processor to perform, when the end-to-end encryption is being performed, the generating, the encrypting, the adding, and the forwarding result in single, end-to-end, encryption of the IP packet from the access router to the second edge router over the wide area network, and wide area network path selection for the encrypted tunnel packet by the first edge router based on the one or more path selectors without decryption of the encrypted tunnel packet.

20. The non-transitory computer readable medium of claim 18, wherein the instructions to cause the processor to perform, when the end-to-end encryption is to be performed:

the generating include instructions to cause the processor to perform copying a first path selector of the one or more path selectors from inner encapsulation for the IP packet;

the encrypting include instructions to cause the processor to perform encrypting the IP packet and the inner encapsulation, to produce the encrypted IP packet and encrypted inner encapsulation; and the adding include instructions to cause the processor to perform adding to the encrypted IP packet and the encrypted inner encapsulation, in clear text, the one or more path selectors and the outer encapsulation, to produce the encrypted tunnel packet.

* * * * *